United States Patent [19]
Gibson et al.

[11] Patent Number: 6,160,699
[45] Date of Patent: Dec. 12, 2000

[54] EQUIPMENT MODULE AND CABINET AND METHODS OF MANUFACTURE THEREOF

[75] Inventors: Keith E. Gibson, Mesquite; Michael C. Steeves, Garland, both of Tex.

[73] Assignee: Lucent Technologies Inc., Murray Hill, N.J.

[21] Appl. No.: 08/898,229

[22] Filed: Jul. 22, 1997

[51] Int. Cl.[7] .................................................. H02B 1/04
[52] U.S. Cl. .......................................... 361/643; 361/825
[58] Field of Search .................................... 361/611, 614, 361/620, 622–626, 634–637, 640–643, 648, 650, 652, 656, 657, 673, 825

[56] References Cited

U.S. PATENT DOCUMENTS

| | | | |
|---|---|---|---|
| 3,170,091 | 2/1965 | Hudson | 361/624 |
| 4,532,574 | 7/1985 | Reiner et al. | 361/641 |
| 5,373,416 | 12/1994 | Tran | 361/825 |
| 5,539,614 | 7/1996 | Ishikawa et al. | 361/652 |
| 5,768,091 | 6/1998 | Vinson et al. | 361/825 |

*Primary Examiner*—Gregory Thompson

[57] ABSTRACT

For use within an equipment cabinet having a rear wall, a pair of opposing side walls projecting forwardly from the rear wall to define a cavity within the cabinet and first and second central bus bars routed within the cavity, an equipment module and methods of manufacturing the equipment module and equipment cabinet employing the module. In one embodiment, the module includes: (1) a bracket having a forward-projecting portion with a rear mount and a front face portion with a side mount, the bracket installable within the cabinet to define first and second segregated pathways within the cavity by coupling the rear mount to the rear wall and the side mount to one of the pair of side walls and (2) an electrical element, mechanically coupled to the bracket and electrically couplable to the central bus bar.

25 Claims, 5 Drawing Sheets

EQUIPMENT MODULE AND CABINET AND METHODS OF MANUFACTURE THEREOF

TECHNICAL FIELD OF THE INVENTION

The present invention is directed, in general, to equipment chassis or cabinets and, more specifically, to an equipment module for an equipment cabinet, methods of manufacture thereof, and an equipment cabinet employing the equipment module.

BACKGROUND OF THE INVENTION

An equipment chassis is a structure that provides both mechanical support and electrical interconnections for electrical and electronic apparatus. For telecommunications applications, in particular, such equipment chassis are often designed as cabinets or racks for receiving and interconnecting various equipment, such as power supplies and electrical distribution devices. In the vernacular of the telecommunications industry, "cabinet" generally describes an enclosed rack-mount structure and "rack" generally describes an open-frame rack-mount structure; as used herein, "cabinet" and "rack" are used interchangeably to describe any structure for receiving and interconnecting electrical and electronic devices or systems, whether such structure is substantially "open" or "enclosed."

It is preferable that equipment cabinets incorporate a modular design philosophy that ensures easy access, simple installation, and fast maintenance and which allows a system to expand in capacity and hardware features as system needs change. Equipment cabinets are widely used in the telecommunications industry because telecommunications networks must be maintained in constant operation and modular equipment cabinets allow for the rapid replacement of failed devices.

In the telecommunications industry, in particular, equipment cabinets should allow for custom configurations and a relatively high density of installed components. A modular design of both the equipment cabinet and the equipment modules provides a customer with the ability to easily select the equipment modules necessary for a specific application. To minimize the number of cabinets required for an application, however, modularity should not come at the expense of decreased component density; e.g., a customer should not have to purchase additional equipment cabinets in order to house the necessary modules for a specific application. This is particularly true in the telecommunications industry where physical space is often limited, for example, within equipment huts at cellular antenna sites.

Prior art equipment cabinets and equipment modules, although providing for some modularity and some adaptability, have had limitations. For example, to accommodate different types of equipment modules or components—such as rectifiers, inverters, converters, system controllers, and AC and DC distribution and circuit protection elements—some equipment cabinets have included separate sections for different types of modules and components. In some cases, a cabinet section may only accept modules of the type designed for that section; thus, although there may be available space in one section of a cabinet, a second cabinet may be required if modules designed for a full section are incompatible with the mechanical and electrical accommodations in the cabinet section having available space.

As noted previously, an equipment cabinet should incorporate a design philosophy that ensures easy access, simple installation, and fast maintenance. During installation, some equipment modules, such as AC and DC power distribution modules, must have electrical conductors coupled thereto; the electrical conductors must also be decoupled when removing a module for replacement or repair. Whereas an equipment cabinet may have many electrical conductors routed to, from and between modules, it is preferable not only that there be easy physical access to each conductor and the coupling means on each module, but also that the conductors not be occluded by the modules or cabinet structure. Many existing equipment cabinets fail to provide such physical access to, and visibility of, the electrical conductors routed therein.

SUMMARY OF THE INVENTION

To address the above-discussed deficiencies of the prior art, the present invention provides, for use within an equipment cabinet having a rear wall, a pair of opposing side walls projecting forwardly from the rear wall to define a cavity within the cabinet and a central bus bar routed within the cavity, an equipment module, and methods of manufacture thereof, and a cabinet employing the equipment module. In one embodiment, the module includes: (1) a bracket having a forward-projecting portion with a rear mount and a front face portion with a side mount, the bracket installable within the cabinet to define first and second segregated pathways within the cavity by coupling the rear mount to the rear wall and the side mount to one of the pair of side walls and (2) an electrical element, mechanically coupled to the bracket and electrically couplable to the central bus bar.

The present invention therefore introduces a new architecture for an equipment cabinet featuring an equipment module that makes better use of a cabinet's depth, providing multiple, segregated pathways for the routing of cables and bus bars within the cabinet. As noted previously, "cabinet" and "rack" are used interchangeably to describe any structure for receiving and interconnecting electrical and electronic devices or systems, whether such structure is substantially "open" or "enclosed." The novel architecture results in a modular structure which provides easy adaptability to customer needs, as well as optimal physical and visual access, which simplifies installation, repair and maintenance. The module itself features a bent bracket that divides the cavity within the cabinet into the segregated pathways and provides a front face for mounting an electrical element; the bracket may be formed, for example, from metal or a non-conductive material such as plastic.

For purposes of the present invention, "electrical element" is defined as a component or piece of equipment that processes or interacts with electrical power, perhaps by switching, modifying, monitoring or presenting information regarding a characteristic of the same. In the specific embodiments disclosed herein, the electrical element is selected from the group consisting of: (1) a circuit breaker, (2) a fuse mount and (3) a relay; the element, however, may be another type of component or equipment falling within the broad definition of "electrical element" set forth above.

In one embodiment of the present invention, the electrical element is mechanically coupled to the front face portion of the bracket to allow the element to be viewed from without the cabinet; thus, the bracket may provide a structure for presenting the element to a viewer. In one embodiment to be illustrated and described, modules may be stacked vertically within a cabinet to present multiple elements in an orderly fashion.

In one embodiment of the present invention, the module further includes a local bus bar extending along at least a portion of the bracket and being electrically insulated therefrom by a dielectric spacer; local bus bars may be employed, for example, to couple the electrical element to the cabinet's central bus bar or to couple the electrical element to one or more electrical loads. The module may further include a ground conductor for returning current from an electrical load back to the cabinet ground safety reference.

In one embodiment, the cabinet includes first and second rack mounts along forward portions of the cabinet side walls, the rack mounts adapted to receive chassis containing electronic systems electrically couplable to the electrical element; those skilled in the art are familiar with rack mounts and their operation. In another embodiment, the cabinet contains battery backup power equipment coupled to the central bus bar, the electrical element providing a path for electricity between the battery backup power equipment and electrical loads coupled thereto; those skilled in the art will recognize, however, that the equipment module, equipment cabinet and the methods of manufacturing thereof have broad application outside the field of battery backup power equipment.

In one embodiment of the present invention, the cabinet cavity is elongated, the segregated pathways extending along a length of the cavity. In one embodiment to be illustrated and described, the central bus bar and the segregated pathways run vertically within a relatively tall cabinet.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2-A illustrates a front isometric view of an exemplary equipment module according to the principles of the present invention;

FIG. 2-B illustrates a rear isometric view of the exemplary equipment module illustrated in FIG. 2-A;

DETAILED DESCRIPTION

Figure 1A:
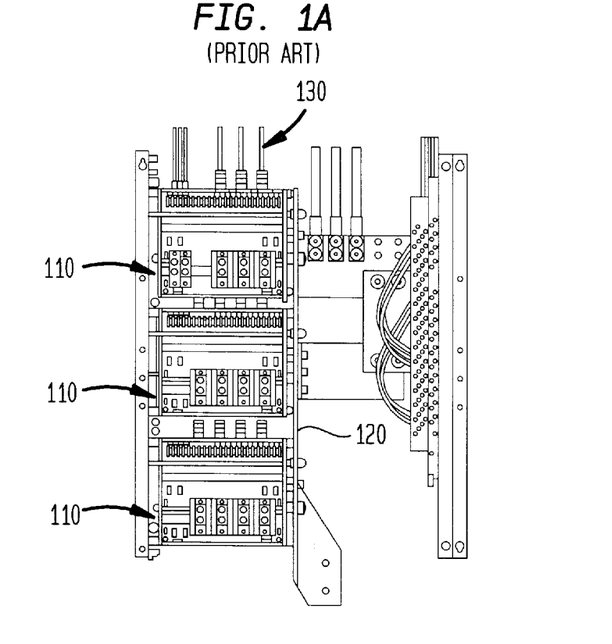
FIG. 1 illustrates front and side views of a portion of a prior art equipment cabinet.
Figure 1B:
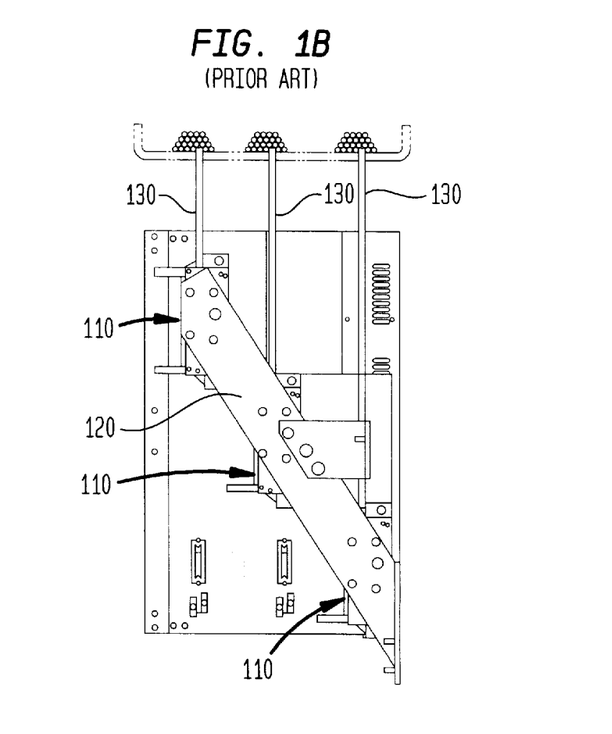

Referring initially to FIG. 1, illustrated are front and side views of a portion of an exemplary prior art equipment cabinet. The portion illustrated is designed to provide a structure for mounting an assortment of electrical distribution devices, such as circuit breakers and fuses, generally designated as 110. The electrical distribution devices 110 each receive electrical power from a bus 120 and distribute the power to associated loads (not shown) via electrical conductors, generally designated as 130. The electrical distribution devices 110 are arranged in three rows which, in the illustrated cabinet, are positioned at different distances from the front of the cabinet. By staggering the depth of the rows of electrical distribution devices 110, rather than vertically-aligning the rows at the front of the cabinet, the electrical conductors 130 are more easily routed and coupled to the electrical distribution devices during installation and maintenance. The electrical conductors 130 coupled to all but the uppermost row of electrical distribution devices 130 are, however, occluded from view from the front of the cabinet, thus making it difficult to visually trace the routing of conductors during inspection and when troubleshooting failures.

Many prior art equipment cabinets, such as that illustrated in FIG. 1, are used to house equipment modules (not shown) in addition to the electrical distribution devices 110. Whereas the number of equipment modules and electrical distribution devices are generally different for each specific application, an equipment cabinet is preferably adaptable to house many different configurations of equipment modules and electrical distribution devices. In many prior art equipment cabinets which provide a unique structure for mounting an assortment of electrical distribution devices, such as the equipment cabinet portion illustrated in FIG. 1, the structure for mounting the devices is designed such that the portion of the cabinet occupied thereby cannot house other equipment modules; i.e., prior art equipment cabinets typically provide separate and unique internal structures for receiving and interconnecting electrical distribution devices and equipment modules. Thus, even if a portion of an equipment cabinet, such as that illustrated in FIG. 1, reserved for mounting electrical distribution devices remains unused, an additional cabinet may be required if more equipment modules are required than can be housed in the portion reserved therefor.

Figure 2A:
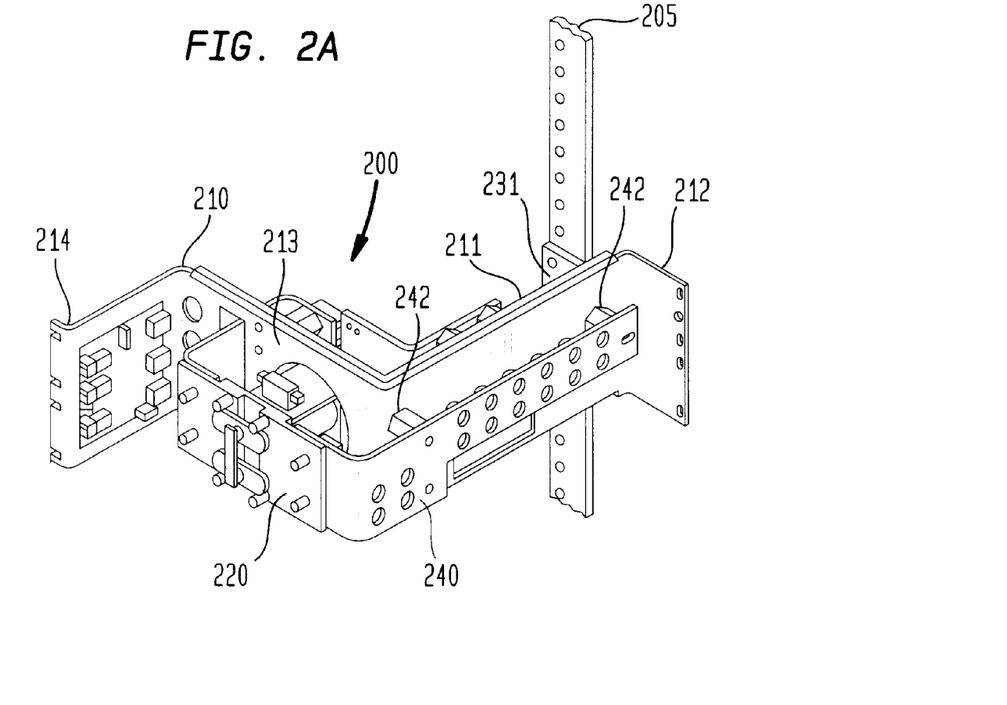
Figure 2B:
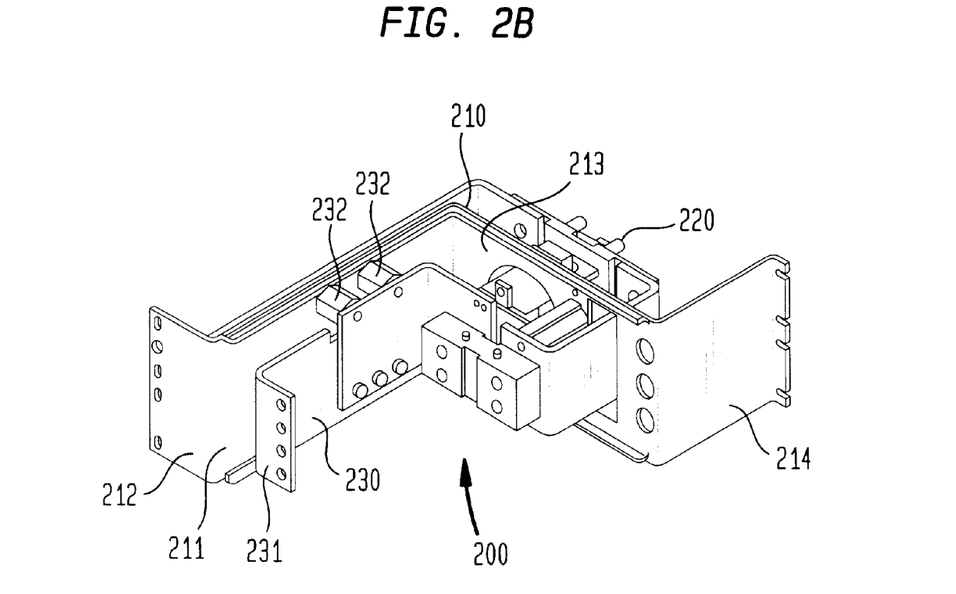

Turning now to FIGS. 2-A and 2-B, illustrated are front and rear isometric views, respectively, of an exemplary equipment module 200 that employs the principles of the present invention. As will be apparent from the description that follows, exemplary equipment module 200 may be employed in an equipment cabinet, illustrated hereinafter, such that the disadvantages described above may be overcome. For example, an equipment cabinet may be designed to accommodate exemplary equipment module 200 and other equipment modules at any mounting location therein; i.e., it is not necessary to reserve portions of the equipment cabinet for specific types of devices, such as electrical distribution devices.

The equipment module 200 is designed for use in an equipment cabinet, described more fully hereinafter, having a rear wall and a pair of opposing side walls projecting forwardly from the rear wall to define a cavity within the cabinet. A central bus bar 205, routed within the cavity in the cabinet, is used to distribute electrical power to equipment modules, such as equipment module 200, coupled thereto. The exemplary equipment module 200 includes a bracket 210 having a forward-projecting portion 211 with a rear mount 212 and a front face portion 213 with a side mount 214; the bracket 210 is installable within an equipment cabinet by coupling the rear mount 212 to the rear wall and the side mount 214 to one of the pair of side walls.

The equipment module 200 further includes an electrical element 220, mechanically coupled to the bracket 210 and electrically couplable to the central bus bar 205. In related embodiments, the electrical element 220 may be either a circuit breaker, a fuse mount, or a relay, which are suitably operative to receive electrical power from the central bus bar 205 and control the distribution of the electrical power to an electrical load coupled to the electrical element; in the embodiment illustrated, the electrical element 220 is a contactor (i.e., a relay) which opens and closes in response to a control signal, whereby an electrical load coupled thereto may be selectively powered off and on. The principles of the present invention, however, are not limited to the aforementioned illustrative electrical elements; those of skill in the art will readily conceive of other embodiments in which the equipment module disclosed by the present invention may be employed to advantage, such embodiments being within the scope of the claims recited hereinafter.

In one embodiment, the electrical element 220 is mechanically coupled to the front face portion 213 of the bracket 210 to allow the electrical element to be viewed from without the equipment cabinet, e.g., viewable from the front of the cabinet. Mounting the electrical element 220 such that it may be easily viewed from the front of the cabinet is particularly advantageous for electrical elements such as circuit breakers, whereby the functional status of the element can be visually ascertained; i.e., service personnel can visually check whether a circuit breaker is tripped.

In one embodiment, the exemplary equipment module further includes a local bus bar 230 that extends along the forward-projecting portion 211 of the bracket 210 and includes a coupling portion 231 for electrically and mechanically coupling the local bus bar to the central bus bar 205. The local bus bar 230 is also coupled to the electrical element 220, whereby the electrical element may receive electrical power from the central bus bar. If the bracket 210 is formed from a conductive material, dielectric spacers 232 are necessary to electrically insulate the local bus bar 230 from the bracket 210.

The equipment module 200 may also include a local bus bar 240 that is adapted to couple the electrical element 220 to at least one electrical load (not shown) through electrical cable or bus bar connections; those skilled in the art are familiar with the construction and use of bus bars for coupling multiple electrical loads to a source of electrical power. Thus, the electrical element 220 receives electrical power from the central bus bar 205 and delivers that power to one or more electrical loads coupled to the local bus bar 240. If the bracket 210 is formed from a conductive material, dielectric spacers 242 are necessary to electrically insulate the local bus bar 240 from the bracket 210.

Figure 3:
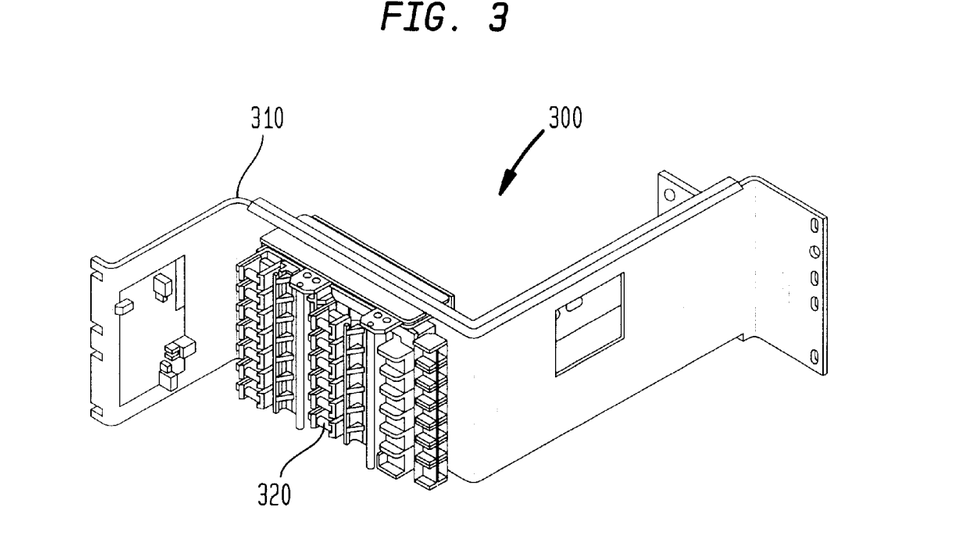
FIG. 3 illustrates a front isometric view of an exemplary equipment module according to the principles of the present invention.

Turning now to FIG. 3, illustrated is a front isometric view of an exemplary equipment module 300. The exemplary equipment module 300 is similar in construction to the exemplary equipment module 200, illustrated in FIGS. 2-A and 2-B, except that the electrical element is a multiple fuse holder 320, with the bracket 310 suitably modified to allow the multiple fuse holder 320 to be coupled thereto. The line side of each fuse holder is couplable to a central bus bar (not shown) in an equipment cabinet and the load side of each fuse holder is couplable to an electrical load (not shown). Fuses having different current limiting characteristics may be inserted in each fuse holder whereby multiple electrical loads (not shown) may be coupled to one equipment module, with a separate fuse providing overcurrent protection for each individual load.

Figure 4:
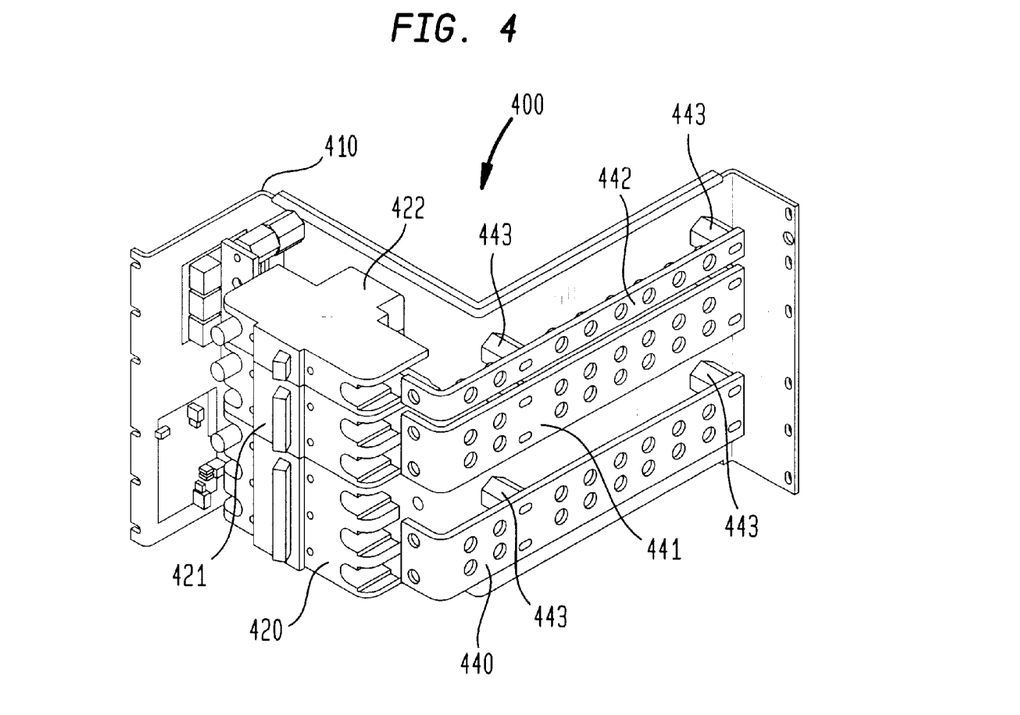
FIG. 4 illustrates a front isometric view of an exemplary equipment module according to the principles of the present invention.

Turning now to FIG. 4, illustrated is a front isometric view of an exemplary equipment module 400, also similar in construction to the exemplary equipment module 200 illustrated in FIGS. 2-A and 2-B, wherein the electrical element is a circuit breaker 420. As illustrated, one equipment module may also include any number of further circuit breakers (or other electrical elements), such as circuit breakers 421, 422, with the bracket 410 suitably modified to allow the circuit breakers 420, 421, 422 to be coupled thereto. The line side of each circuit breaker is couplable to a central bus bar (not shown) in an equipment cabinet and the load side of each circuit breaker is couplable to an electrical load (not shown). Circuit breakers having different current limiting characteristics may be used whereby multiple electrical loads (not shown) may be coupled to one equipment module, with a separate circuit breaker providing overcurrent protection for each individual load.

The equipment module 400 may also include local bus bars 440, 441, 442 that are adapted to couple the circuit breakers 420, 421, 422, respectively, to at least one electrical load (not shown) Thus, the circuit breakers 420, 421, 422 receive electrical power from a central bus bar and deliver that power to one or more electrical loads coupled to the local bus bars 440, 441, 442, respectively. If the bracket 410 is formed from a conductive material, dielectric spacers, generally designated as 443, are necessary to electrically insulate the local bus bars 440, 441, 442 from the bracket 410.

From the foregoing description of exemplary equipment modules 200, 300 and 400, those skilled in the art will recognize that the present invention broadly discloses an equipment module design that is adaptable to provide mechanical support and electrical interconnections to many types and combinations of electrical elements; the electrical elements may distribute electrical power to one or more electrical loads coupled thereto. Furthermore, as will be described hereinafter, the novel equipment module design disclosed herein allows for more efficient use of space in an equipment cabinet and provides for easy physical access to each load conductor coupled thereto.

Figure 5:
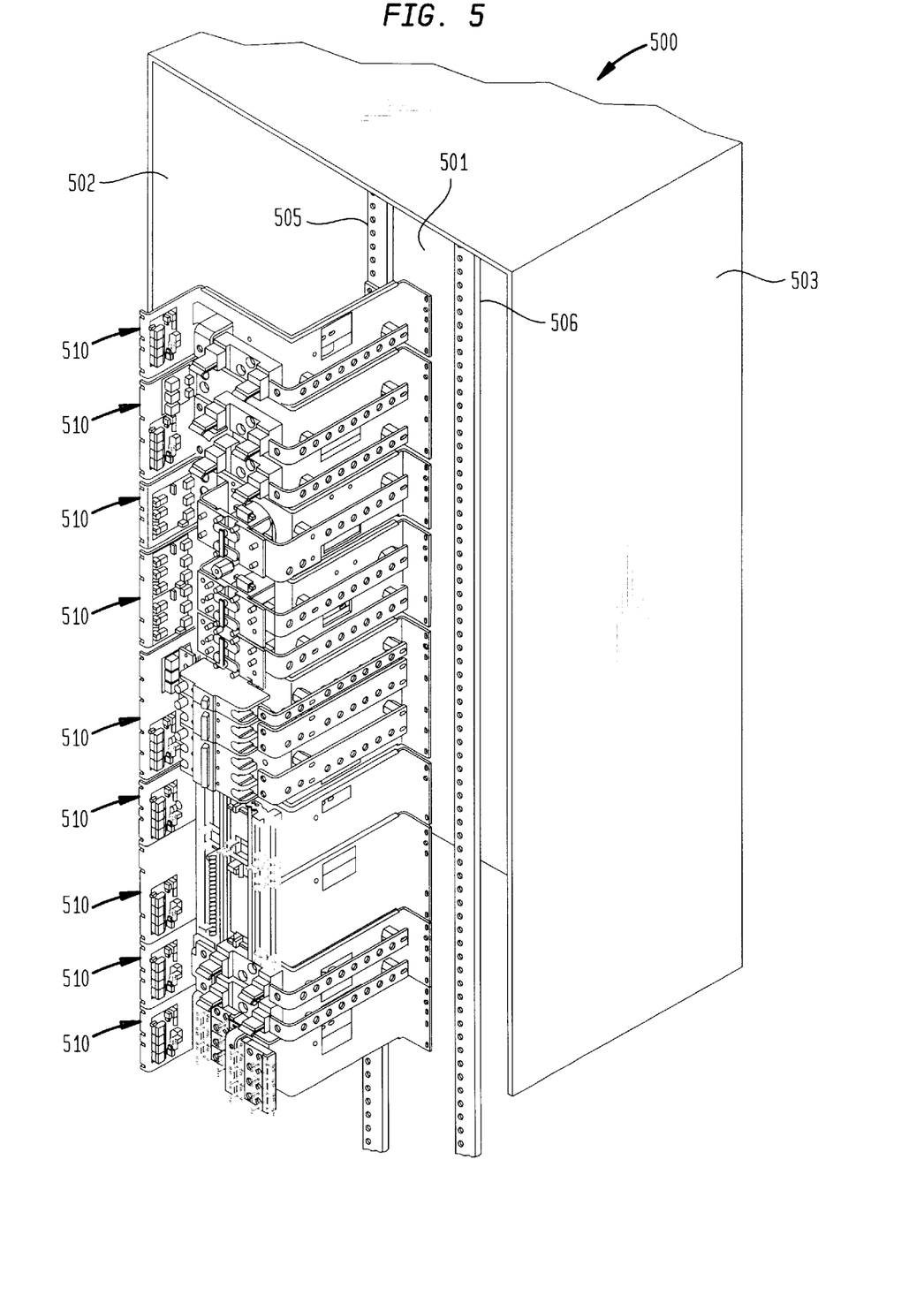
FIG. 5 illustrates a partial isometric view of an exemplary equipment cabinet housing a plurality of exemplary equipment modules according to the principles of the present invention.

Turning now to FIG. 5, illustrated is a partial isometric view of an exemplary equipment cabinet 500 housing exemplary equipment modules, generally designated 510. The equipment cabinet includes a rear wall 501 and left and right side walls 502 and 503, respectively. The opposing left and right side walls 502, 503 project forward from the rear wall 501 to define a cavity within the equipment cabinet 500 for containing equipment. The equipment cabinet 500 further includes central bus bars 505, 506, which extend along a length of the cavity. In the embodiment illustrated, central bus bar 505 is couplable to a source of electrical power, such as a power supply (not shown), which may also be housed within the equipment cabinet 500. The central bus bar 506 may be used as a ground or neutral return for electrical loads (not shown) coupled to the electrical elements mounted to the equipment modules 510.

The exemplary equipment modules 510 may be identical to exemplary equipment modules 200, 300, 400 described hereinabove, or variations thereof, the open structure of exemplary equipment cabinet 500 is suitably adapted to house a large number of combinations of such equipment modules. Each equipment module 510 is coupled to the equipment cabinet 500 by fastening the rear mount to the rear wall and the side mount to the left side wall 502 as described above with reference to exemplary equipment module 200. Once installed, the equipment modules 510 divide the cavity of equipment cabinet 500 into two segregated pathways; one segregated pathway containing central bus bar 505 and a second segregated pathway containing central bus bar 506.

The line side of each electrical element associated with equipment modules 510 are coupled to the central bus bar 505 using a local bus bar (not shown; see description above with reference to FIG. 2-B) or other means. An electrical load (not shown) may receive electrical power from the central bus bar 505, via an electrical element associated with an equipment module 510, by coupling the electrical load to the load side of an electrical element and to the central bus bar 506. Those skilled in the art will recognize that the structural design of equipment cabinet 500 and equipment modules 510 thus provide easy physical access to load conductors and the coupling means on each equipment module, and that load conductors are not occluded by the modules or cabinet structure.

Figure 6:
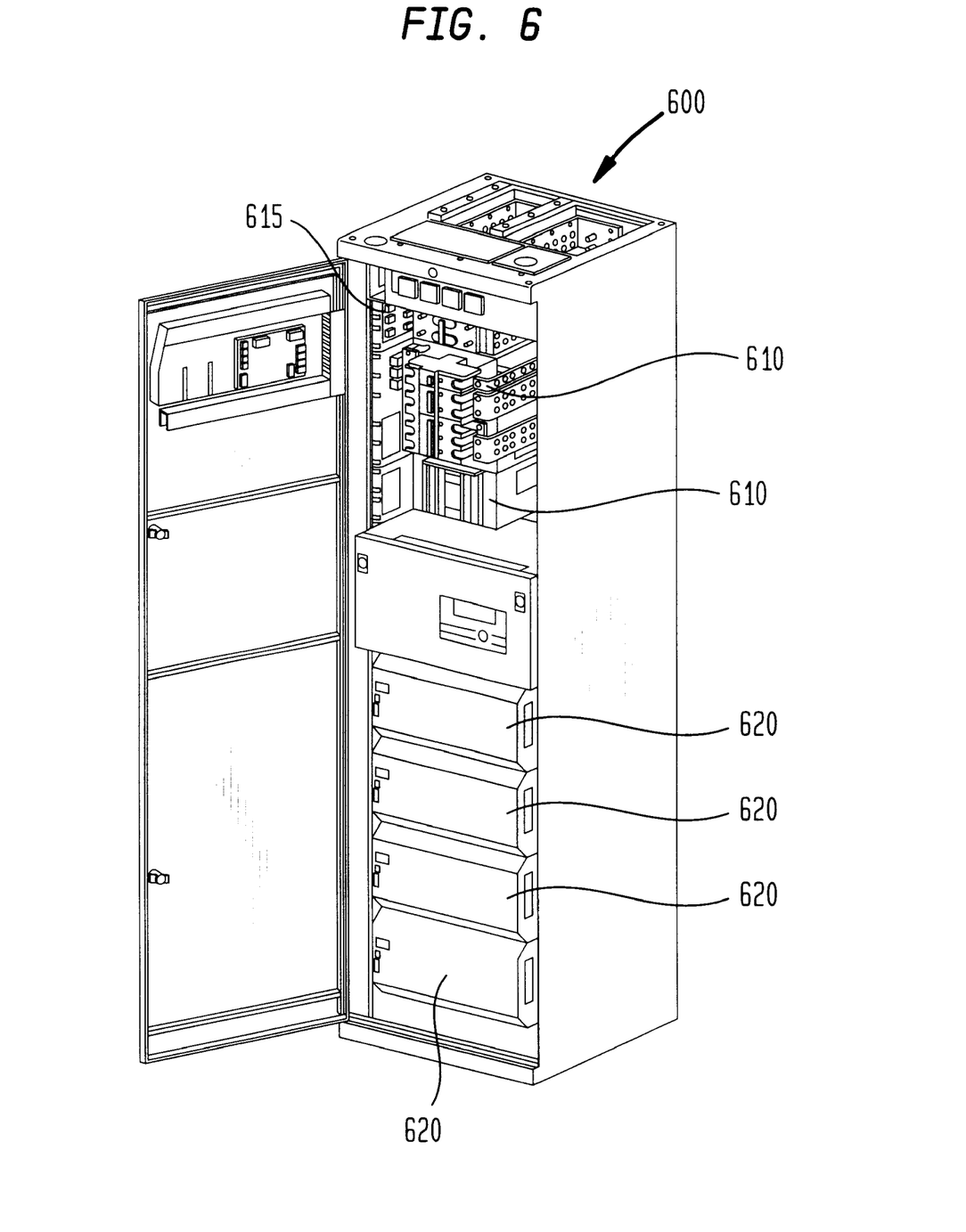
FIG. 6 illustrates an isometric view of an exemplary equipment cabinet housing a plurality of exemplary equipment modules, including battery backup power equipment modules, according to the principles of the present invention.

Turning now to FIG. 6, illustrated is an isometric view of an exemplary equipment cabinet 600 housing a plurality of exemplary equipment modules, generally designated as 610, and backup power modules, generally designated as 620. The equipment cabinet includes rack mount rails 615 (one visible) that extend vertically along forward portions of the left and right side walls of equipment cabinet 600; those skilled in the art are familiar with the construction and use of rack mount rails for receiving and coupling chassis containing electrical devices in an equipment cabinet. A side mount 214 on the front face portion 213 (see description above with reference to FIG. 2-A) of each equipment module 610 is coupled to the rack mount rail 615; the rear mount of each equipment module is coupled to a rear wall of equipment cabinet 600.

In addition to the equipment modules 610, the equipment cabinet 600 may house other electrical devices or systems, such as backup power modules 620. Those skilled in the art are familiar with backup power systems and their use, in particular, with telecommunications systems. The backup power modules 620 may house, for example, converters, inverters, rectifiers and storage batteries. The backup power modules 620 may be coupled to central bus bars 505, 506 (see description above with reference to FIG. 5), whereby backup power may be provided to electrical loads via the electrical elements associated with the equipment modules 610.

From the foregoing, those skilled in the art will recognize that the present invention discloses an equipment module and equipment cabinet design that allows equipment modules to be coupled at any vertical position within the cabinet, thus providing greater flexibility and efficient use of cabinet space that possible with conventional designs. Although the present invention has been described in detail, those skilled in the art should understand that they can make various changes, substitutions and alterations herein without departing from the spirit and scope of the invention in its broadest form.

What is claimed is:

1. An equipment module, comprising:

a bracket having a forward-projecting portion with a rear mount and a front face portion with a side mount, said bracket installable within an equipment cabinet to define first and second segregated pathways within a cavity of said cabinet by coupling said rear mount to a rear wall of said cabinet and said side mount to one of a pair of side walls of said cabinet;

an electrical element, mechanically coupled to said bracket and electrically couplable to a central bus bar of said cabinet; and a local bus bar extending along at least a portion of said bracket and being electrically insulated therefrom by a dielectric spacer.

2. The equipment module as recited in claim 1 wherein said electrical element is mechanically coupled to said front face portion of said bracket.

3. The equipment module as recited in claim 1 wherein said local bus bar is adapted to couple said electrical element to said central bus bar.

4. The equipment module as recited in claim 1 wherein said local bus bar is adapted to couple said electrical element to at least one electrical load.

5. The equipment module as recited in claim 1 wherein said electrical element is selected from the group consisting of:

a circuit breaker, a fuse mount, and a relay.

6. The equipment module as recited in claim 1 wherein said cavity is elongated, said segregated pathways extending along a length of said cavity.

7. The equipment module as recited in claim 1 wherein said cabinet further has first and second rack mounts coupled to forward portions of said side walls, said side mount of said equipment module couplable to one of said first and second rack mounts.

8. The equipment module as recited in claim 1 wherein said cabinet contains backup power equipment coupled to said central bus bar, said electrical element providing a path for electricity between said backup power equipment and an electrical load coupled thereto.

9. A method of manufacturing an equipment module, comprising:

forming a bracket having a forward-projecting portion and a front face portion;

creating a rear mount on said forward-projecting portion and a side mount on said front face portion, said bracket installable within an equipment cabinet to define first and second segregated pathways within a cavity of said cabinet by coupling said rear mount to a rear wall of said cabinet and said side mount to one of a pair of side walls of said cabinet;

mechanically coupling an electrical element to said bracket, said element electrically couplable to a central bus bar of said cabinet;

mounting a local bus bar to said bracket, said local bus bar extending along at least a portion of said bracket; and electrically insulating said local bus bar from said bracket with a dielectric spacer.

10. The method as recited in claim 9 wherein said step of mechanically coupling comprises the step of mechanically coupling said electrical element to said front face portion.

11. The method as recited in claim 9 wherein said local bus bar is adapted to couple said electrical element to said central bus bar.

12. The method as recited in claim 9 wherein said local bus bar is adapted to couple said electrical element to at least one electrical load.

13. The method as recited in claim 9 wherein said electrical element is selected from the group consisting of:
   a circuit breaker,
   a fuse mount, and
   a relay.

14. The method as recited in claim 9 wherein said cavity is elongated, said segregated pathways extending along a length of said cavity.

15. The method as recited in claim 9 wherein said cabinet further has first and second rack mounts coupled to forward portions of said side walls, said side mount of said equipment module couplable to one of said first and second rack mounts.

16. The method as recited in claim 9 wherein said cabinet contains backup power equipment coupled to said central bus bar, said electrical element providing a path for electricity between said backup power equipment and an electrical load coupled thereto.

17. An equipment cabinet, comprising:
   a rear wall;
   a pair of opposing side walls projecting forwardly from said rear wall to define a cavity within said cabinet for containing equipment;
   first and second central bus bars routed along a length of said cavity; and
   an equipment module, including:
      a bracket having a forward-projecting portion with a rear mount and a front face portion with a side mount, said bracket installable within said cabinet to define first and second segregated pathways extending along a length of said cavity and separating said first and second central bus bars by coupling said rear mount to said rear wall and said side mount to one of said pair of side walls, and
      an electrical element, mechanically coupled to said bracket and electrically couplable to said first central bus bar.

18. The equipment cabinet as recited in claim 17 wherein said electrical element is mechanically coupled to said front face portion of said bracket.

19. The equipment cabinet as recited in claim 17 further comprising a local bus bar extending along at least a portion of said bracket and being electrically insulated therefrom by a dielectric spacer.

20. The equipment cabinet as recited in claim 19 wherein said local bus bar is adapted to couple said electrical element to said first central bus bar.

21. The equipment cabinet as recited in claim 19 wherein said local bus bar is adapted to couple said electrical element to at least one electrical load.

22. The equipment cabinet as recited in claim 17 wherein said electrical element is selected from the group consisting of:
   a circuit breaker,
   a fuse mount, and
   a relay.

23. The equipment cabinet as recited in claim 17 wherein said cavity is elongated, said segregated pathways extending along a length of said cavity.

24. The equipment cabinet as recited in claim 17 further comprising first and second rack mounts coupled to forward portions of said side walls, said side mount of said equipment module couplable to one of said first and second rack mounts.

25. The equipment cabinet as recited in claim 17 further comprising backup power equipment coupled to said first and second central bus bars, said electrical element providing a path for electricity between said backup power equipment and an electrical load coupled thereto.

* * * * *